United States Patent
Ito et al.

(10) Patent No.: US 9,878,451 B2
(45) Date of Patent: Jan. 30, 2018

(54) AUTOMATED ROBOTIC ASSEMBLY SYSTEM

(71) Applicant: FANUC Corporation, Yamanashi (JP)

(72) Inventors: Kenichi Ito, Yamanashi (JP); Cheng Liu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 24 days.

(21) Appl. No.: 15/196,182

(22) Filed: Jun. 29, 2016

(65) Prior Publication Data

US 2017/0015002 A1 Jan. 19, 2017

(30) Foreign Application Priority Data

Jul. 17, 2015 (JP) .................... 2015-143105

(51) Int. Cl.
*G05B 19/04* (2006.01)
*G05B 19/18* (2006.01)
*B25J 9/16* (2006.01)

(52) U.S. Cl.
CPC ........... *B25J 9/1687* (2013.01); *B25J 9/1674* (2013.01); *G05B 2219/36195* (2013.01); *G05B 2219/37274* (2013.01); *G05B 2219/40032* (2013.01); *G05B 2219/40033* (2013.01); *G05B 2219/40223* (2013.01); *Y10S 901/09* (2013.01); *Y10S 901/46* (2013.01)

(58) Field of Classification Search
CPC ...... B25J 9/1674; B25J 9/1687; B25J 9/1675; B25J 9/1678; B25J 9/1694; G05B 2219/36195; G05B 2219/37274; G05B 2219/40032; G05B 2219/40033; G05B 2219/40223; Y10S 901/46; Y10S 901/09; H05K 3/00; H05K 3/34; H05K 1/02

See application file for complete search history.

(56) References Cited

U.S. PATENT DOCUMENTS

| | | | | |
|---|---|---|---|---|
| 4,964,211 A | * | 10/1990 | Arao | ................ B23P 19/00 29/705 |
| 5,410,108 A | * | 4/1995 | Williams | ............ G01G 19/4144 177/126 |
| 2006/0107768 A1 | * | 5/2006 | Johnson | ................. G01L 1/142 73/862.628 |

FOREIGN PATENT DOCUMENTS

JP 2002-134853 A 5/2002

\* cited by examiner

*Primary Examiner* — Nicholas Kiswanto
*Assistant Examiner* — Rachid Bendidi
(74) *Attorney, Agent, or Firm* — Hauptman Ham, LLP (57) ABSTRACT

An automated robotic assembly system is configured to assemble a device by fitting a first component made of a material liable to deformation by external force with a second component by means of a robot, and the first component is provided with a distortion detection unit for detecting distortion thereof. If the distortion detected by the distortion detection unit exceeds a predetermined value, a signal for notifying abnormality is output to stop an automated assembly operation by the robot.

7 Claims, 4 Drawing Sheets

AUTOMATED ROBOTIC ASSEMBLY SYSTEM

BACKGROUND OF THE INVENTION

Field of the Invention

The present invention relates to an automated robotic assembly system configured to automatically assemble a device by fastening various components constituting the device by means of an assembly robot.

Description of the Related Art

In assembling devices, unmanned, automated assembly systems are used in various fields such that various components are automatically fastened by assembly robots to assemble the devices.

For example, an automated assembly system has been developed in which work to mount various components on a printed circuit board used in an electronic device is also unmanned and assembly work is performed by an assembly robot. If stress above a certain level is applied to the printed circuit board during the assembly work, however, the printed circuit board may possibly be distorted so that soldered areas of component-mounting portions are cracked or semiconductor components such as capacitors are broken. Since the operation of the electronic device is not affected by cracks in the capacitors immediately after their occurrence, moreover, defects, if any, of the device cannot be detected at the time of product shipment inspection but may be revealed after shipment to the field, in some cases. In view of reliability, therefore, there is a method of preventing the electronic device from being stressed as it is assembled.

Japanese Patent Application Laid-Open No. 2002-134853 discloses a method in which a strain gage is provided in advance on the substrate of a printed circuit board so that distortion of the printed circuit board can be measured by measuring the resistance of the resistor of the strain gage. According to this method, the printed circuit board is rejected as a non-conforming product if the resulting measured value (distortion) exceeds a predetermined value. Also, this patent document discloses a method in which a electrically-conducting path of a stress detecting pattern is provided in advance as a stress detecting member around a component mounting area on the surface of the printed circuit board so that the resistance of the electrically-conducting path of the stress detecting pattern can be measured before a surface mounted component is attached to the printed circuit board. Also, according to this method, the resistance of the electrically-conducting path of the stress detecting pattern is measured again after the surface mounted component is attached to the printed circuit board. Consequently, if the difference between measured values obtained before and after the attachment of the surface mounted component is not less than a predetermined value, the printed circuit board is considered to be stressed and is rejected as a non-conforming product. Thus, if the printed circuit board is stressed, a part of the electrically-conducting path of the stress detecting pattern is disconnected or deformed. Once the electrically-conducting path is disconnected or deformed, it can never be restored as before. Based on the change in the resistances of the electrically-conducting path before and after the mounting of the components on the printed circuit board, therefore, such a history is determined that the printed circuit board is subjected to stress above a certain level as the components are mounted and assembled, so that defects, if any, of the printed circuit board mounted with the components can be detected.

According to the conventional technique disclosed in Japanese Patent Application Laid-Open No. 2002-134853, it is detected whether or not the printed circuit board mounted on which the components is mounted is distorted. This conventional technique determines whether or not the stress above the certain level is applied to the printed circuit board, based on the change in the resistances of the electrically-conducting path of the stress detecting pattern before and after the mounting of the components on the printed circuit board. As the surface mounted components are attached to this printed circuit board, the printed circuit board is highly stressed so that it is strongly bent and undergoes deformation (so-called plastic deformation) of such a level that it cannot be restored to its normal shape. The printed circuit board with the resistance of the electrically-conducting path of the stress detecting pattern changed is detected by detecting the deformation. Thus, defects, if any, of the printed circuit board that is not elastically deformed despite the high stress thereon cannot be detected.

However, many of printed circuit boards generally have elasticity and their deformation caused on an actual manufacturing floor falls within an elastic region that allows to restore to their original shape. Even elastic deformation may possibly affect (e.g., break) components on the printed circuit boards. According to the conventional technique described in Japanese Patent Application Laid-Open No. 2002-134853, the distortion and the resistance of the electrically-conducting path of the stress detecting pattern after plastic deformation of the printed circuit board are measured. Therefore, the plastic deformation of the printed circuit board cannot be prevented and distortion or elastic deformation of the printed circuit board, which may break the components or reduce the quality of soldering, cannot be detected.

Also in some automated assembly systems for devices other than the above-described electronic device with the mounting components attached to the printed circuit board, distorted or stressed assembly components may be assembled in their automated assembly operation. In this case, failures, if any, cannot be detected at the time of the assembly but may be actualized during prolonged use of the assembled device.

SUMMARY OF THE INVENTION

Accordingly, the object of the present invention is to provide an automated robotic assembly system configured to assemble a device by combining components constituting the device by means of an automated assembly robot, in which the components constituting the device are prevented from being excessively stressed during assembly work therefor so that breakage of the surface mounted components and reduction in the quality of the components can be prevented.

An automated robotic assembly system according to the present invention is configured to assemble a device by fitting a component made of a material liable to deformation by external force with another component by means of a robot and comprises a robot controller configured to control the robot, a distortion detection unit provided on the component made of the material liable to deformation and configured to detect distortion thereof, and a distortion determining unit configured to receive a distortion signal detected by the distortion detection unit and output an abnormal signal if the size of the distortion signal exceeds a predetermined threshold. The robot controller is configured to stop an automated assembly operation by the robot when the abnormal signal is output by the distortion determining unit.

The distortion detection unit may be disposed in each of a plurality of positions on the component made of the material liable to deformation.

The robot controller may comprise an adjusting unit configured to adjust a robot motion for connecting components in the process of automated assembly operation each other. After the abnormal signal is output by the distortion determining unit and the assembly operation is stopped, the robot controller may adjust the robot motion by the adjusting unit and carries out the assembly operation. And, when the robot motion for connecting components is completed without the abnormal signal output from the distortion determining unit, the robot controller may continue control of the subsequent automated assembly operation.

The adjusting unit of the robot controller may be configured to previously store a plurality of adjustment programs for the robot motion for connecting components each other with the position or attitude of a robot hand varied, and the robot controller may be configured to sequentially execute the stored adjustment programs when the abnormal signal is output by the distortion determining unit.

The adjustment programs may also include a robot motion program for connecting components each other by replacing a component to be attached to the component made of the material liable to deformation with another component.

The component made of the material liable to deformation may be a printed circuit board.

The robot motion for connecting components each other may be a motion to insert another component into a connector provided on the printed circuit board.

According to the present invention, if it is detected that distortion caused in a component made of a material liable to deformation has reached a predetermined value or higher during work to connect another component to the component made of the material liable to deformation, in assembling a device by attaching these components to each other, the assembly work for the device is stopped. Therefore, the components can be prevented from being subjected to such excessive stress that the attached components are broken or their quality is reduced. If it is detected that distortion of the predetermined value or higher is caused in the components, moreover, an assembly work operation for a robot is stopped and the motion of the robot is automatically adjusted so that the assembly operation is performed in such a manner that the stress on the components never reaches the predetermined value or higher. Thus, there can be obtained a high-quality device on which components are mounted such that excessive stress cannot be applied to the component made of the deformable material and that such plastic or elastic deformation as to damage the components or reduce their quality can be prevented.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

The present invention is applied to an automated assembly system for various devices, such as electronic devices and numerical controllers for controlling machine tools. Operations in which force is applied to components of the devices, thereby causing stress or distortion, during an automated assembly operation include an operation for connecting the components of the devices. In the automated robotic assembly operation, a robot conveys and positions a component relative to another component, and the relatively positioned components are connected and secured to each other. The components are subjected to force and stressed or distorted during this connection operation. If the components, especially easily deformable components, are subjected to force and stressed or distorted during this connection operation, the assembly work (connection operation work) is stopped so that devices with deformed or distorted components cannot be manufactured.

An automated robotic assembly system according to a first embodiment of the present invention will first be described with reference to FIGS. 1 to 4. In this automated assembly system, an electronic device is assembled by a robot that connects the components to a printed circuit board by connectors.

Figure 1:
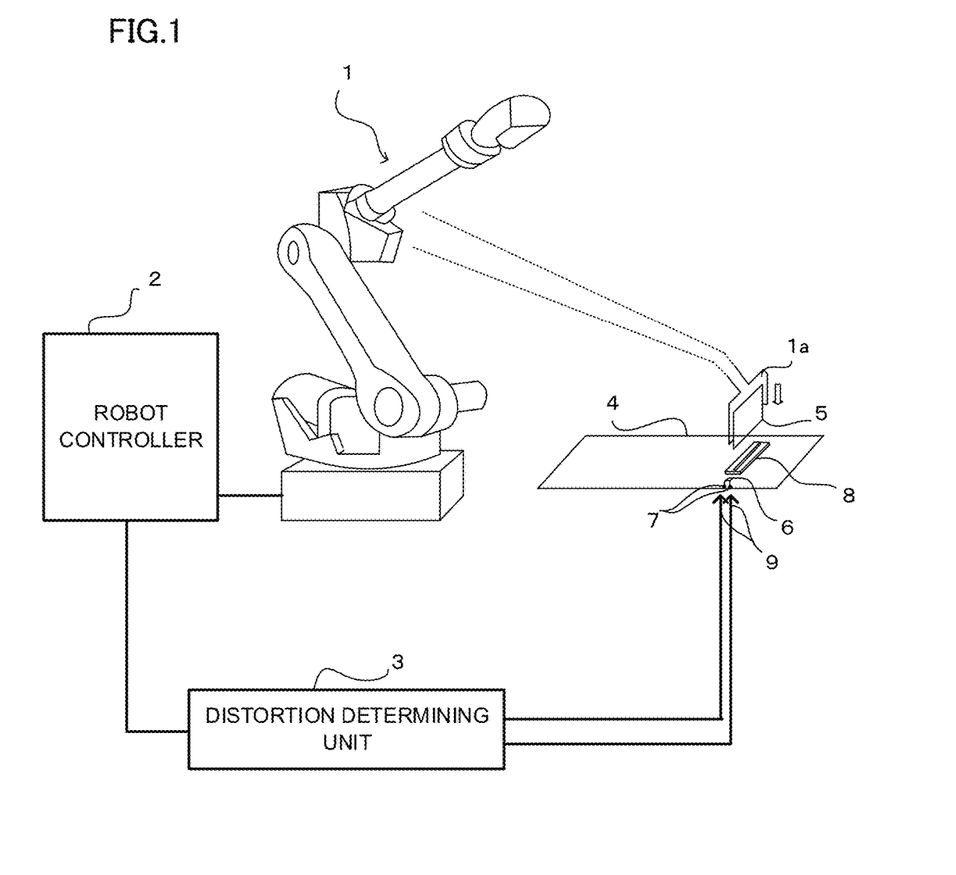
FIG. 1 is a schematic diagram of an automated robotic assembly system for an electronic device comprising a printed circuit board according to a first embodiment of the present invention.

FIG. 1 is a schematic diagram of the automated robotic assembly system for the electronic device comprising the printed circuit board according to the first embodiment of the present invention.

An automated assembly robot 1 is controlled by a robot controller 2. The electronic device is assembled in such a manner that a component 5 is gripped by a hand 1a of the robot 1, inserted into a connector 8 on a printed circuit board 4, and connected to the printed circuit board 4. In this respect, the system is constructed in the same manner as the conventional automated robotic assembly system. In the present invention, however, the printed circuit board 4 is a device component that is more easily deformable than the other components. Therefore, this printed circuit board 4 is provided with a distortion detection unit and a distortion determining unit 3 configured to determine the distortion of the printed circuit board by the output of the distortion detection unit. The distortion detection unit on the printed circuit board 4 comprises strain gages 6 and measuring pads 7 electrically connected to the strain gages 6.

Further, the distortion identification unit 3 comprises measuring probes 9 configured to contact the measuring pads 7 and pick up distortion signals detected by the strain gages 6. The sizes of the distortion signals detected by the measuring probes 9 are compared with a threshold set based on the value of a distortion signal generated during normal assembly. If the sizes of the detected distortion signals consequently exceed the threshold, an interrupt signal is delivered as an abnormal signal to the robot controller 2.

The robot controller 2 executes an automated assembly program to control the motion of the robot 1. The robot 1 grips and conveys the component 5 (e.g., a printed circuit board separate from the printed circuit board 4) by the robot hand 1a, inserts into and connects it to the connector 8 on the printed circuit board 4, and performs the assembly operation for assembling the electronic device.

During the execution of the automated assembly program, the distortion determining unit 3 detects the distortion signals, via the measuring probes 9, from the distortion detection unit that comprises the strain gages 6 and the measuring pads 7 connected to the strain gages 6, and compares the detected distortion signals with the predetermined threshold. The distortion is caused in the printed circuit board 4 during the connection operation in which the component 5 is inserted into and connected to the connector 8. The distortion caused during the connection operation is detected by the distortion detection unit. If the sizes of the detected distortion signals are larger than the threshold, the distortion determining unit 3 delivers the interrupt signal as the abnormal signal to the robot controller 2.

On receiving the abnormal signal from the distortion determining unit 3, the robot controller 2 temporarily stops an operation program, that is, a connection operation program (insertion program), in the automated assembly program then being executed, and moves the robot hand 1a to a predetermined reference position (position for the start of insertion of the component 5 into the connector 8) and stops at that position.

If no abnormal signal is generated from the distortion determining unit 3, in contrast, the robot controller 2 continues the automated assembly work operation.

If the abnormal signal is generated from the distortion determining unit 3 so that the insertion of the component 5 is stopped, the cause of the distortion based on the insertion of the component 5 is investigated and removed, and the insertion of the component is resumed. Consequently, the distortion caused in the printed circuit board 4 by the assembly operation is detected during the assembly operation that causes the distortion, so it is possible to prevent generation of such distortion exceeding a predetermined value. Thus, such deformation (elastic or plastic deformation) of the component as to reduce the quality can be prevented.

If the assembly work for the electronic device is finished with the component 5 inserted into and connected to the connector 8 of the printed circuit board 4 without generating any abnormal signal from the distortion determining unit 3, operations for the assembly work are completed without causing any unduly large distortion. Accordingly, there is no possibility of the printed circuit board being distorted or plastically deformed so that soldered areas of component-mounting portions are cracked or semiconductor components such as capacitors mounted on the printed circuit board are broken. Further, high-quality electronic devices can be assembled without manufacturing devices with distorted or plastically deformed components.

In the present embodiment, moreover, a robot motion adjusting unit is provided for seeking a motion (position/attitude) of the robot hand such that the component 5 can be automatically inserted into and mounted on the printed circuit board 4 without causing any excessive distortion after the automated assembly work operation by the robot is stopped due to an abnormal signal generated from the distortion determining unit 3. The robot motion adjusting unit is used to adjust the robot motion (position/attitude) so that the component 5 can be inserted without generating any abnormal signal from the distortion determining unit 3, thereby automatically completing the assembly work to the end.

Figure 2:
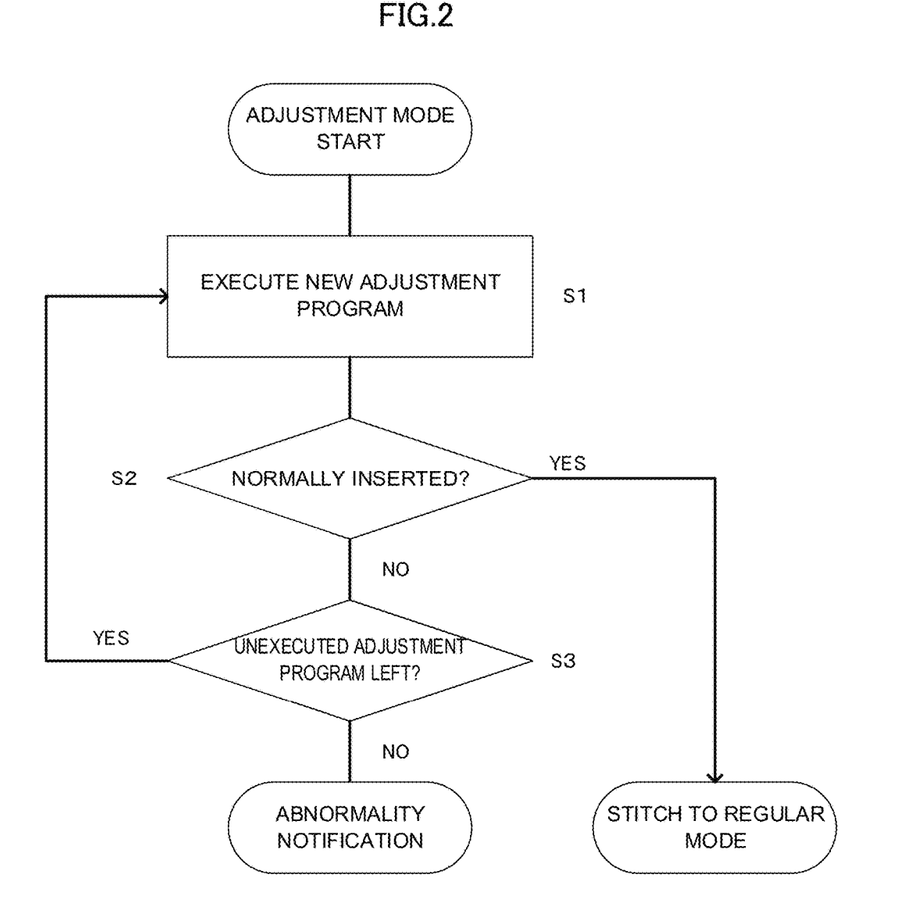
FIG. 2 is a flowchart showing a flow of robot motion adjustment mode processing executed by a robot controller constituting the automated assembly system of FIG. 1 as an adjusting unit for adjusting the motion of a robot.

FIG. 2 is a flowchart showing robot motion adjustment mode processing executed by the robot controller 2 constituting the automated assembly system of FIG. 1 as the adjusting unit for adjusting the robot motion.

A program for the robot motion adjustment mode shown in the flowchart of FIG. 2 is stored in the robot controller 2 in advance. Further, a plurality of irregular connection operation programs (insertion programs), different from regular connection operation programs (insertion programs) which are a part of the automated assembly operation programs executed by the robot controller 2 and may possibly stress and distort the component (printed circuit board) and generate an abnormal signal, are stored, as adjustment programs, in the robot controller 2. The connection operation programs (insertion operation programs) different from the regular connection operation programs include an operation program for performing an insertion operation at an irregular position and attitude with parameters of insertion positions and angle of insertion directions of the robot hand 1a changed and also an operation program for performing an insertion operation of another component that is substituted for the component 5 gripped by the robot hand 1a.

Figure 3:
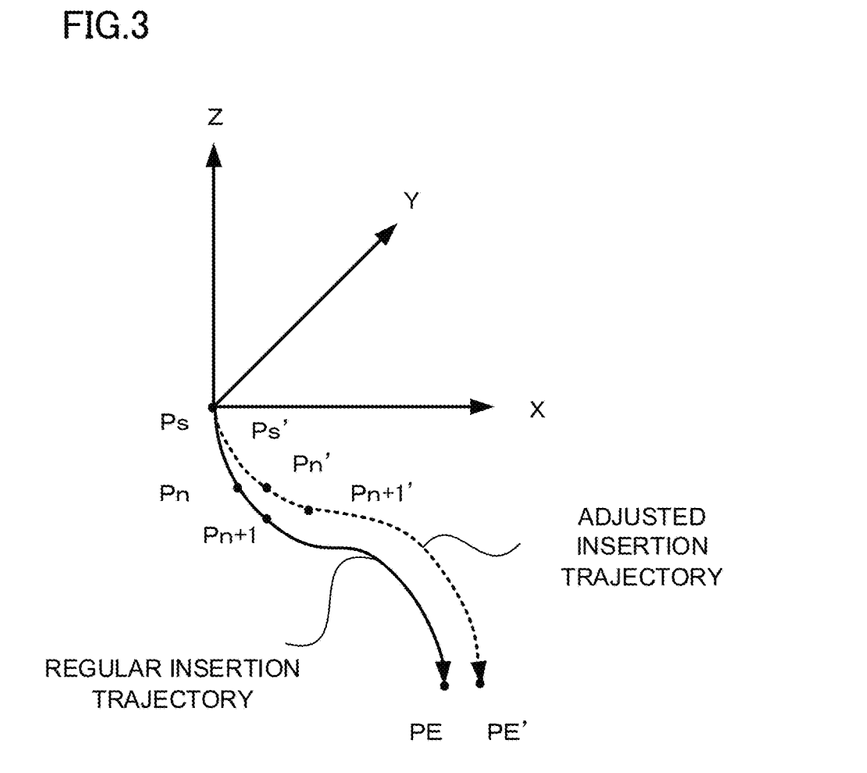
FIG. 3 is a schematic diagram illustrating an outline of operation performed based on adjustment programs for insertion by the automated assembly system of FIG. 1 with a component insertion position varied.
Figure 4:
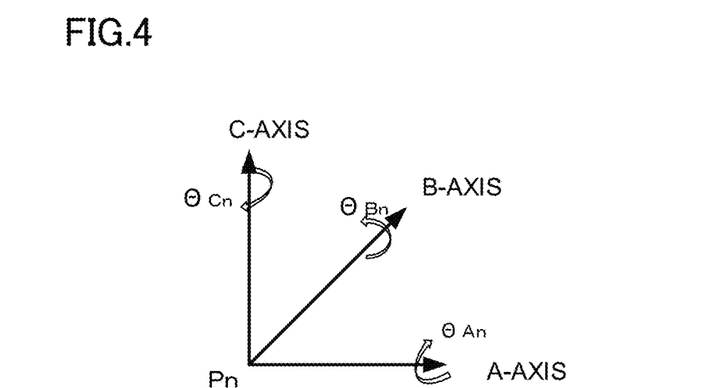
FIG. 4 is a schematic diagram illustrating an outline of operation performed based on the adjustment programs for insertion by the automated assembly system of FIG. 1 with a component insertion angle varied.

FIGS. 3 and 4 are diagrams illustrating an outline of operations performed based on the adjustment programs with the insertion position and angle varied.

In FIG. 3, a regular insertion trajectory of the robot hand comprises a start point $P_s$, passing points $P_n$, $P_{n+1}$, . . . , end point $P_E$, and an adjusted insertion trajectory comprises a start point $P_s'$, passing points $P_n'$, $P_{n+1}'$, . . . , end point $P_E'$.

The positional relationship between the regular insertion trajectory and the adjusted insertion trajectory is programmed so as to satisfy the following equation (1). The position of the robot hand at the time of adjusted insertion is a position shifted from the position $(X_n, Y_n, Z_n)$ at the time of regular insertion by the variation $(\Delta X_n, \Delta Y_n, \Delta Z_n)$. As shown in FIG. 4, moreover, the attitude of the robot hand 1a in each position on the regular insertion trajectory and the adjusted insertion trajectory is programmed so as to satisfy the following equation (2). In FIG. 4, furthermore, an A-axis, B-axis, and C-axis are shown as rotary axes extending at right angles to one another. The attitude of the robot hand at the time of the adjusted insertion is calculated by adding an insertion angle variation $(\Delta\theta_{An}, \Delta\theta_{Bn}, \Delta\theta_{Cn})$ to a regular insertion angle $(\theta_{An}, \theta_{Bn}, \theta_{Cn})$. The insertion trajectory of the robot hand and the attitude of the robot hand in each position on the trajectory can be freely adjusted by setting the variation $(\Delta X_n, \Delta Y_n, \Delta Z_n)$ and the insertion angle variation $(\Delta\theta_{An}, \Delta\theta_{Bn}, \Delta\theta_{Cn})$ for each position, depending on the types of the component 5 to be inserted and the connector 8.

Regular insertion trajectory:

$$P_s = (X_s, Y_s, Z_s),$$

$$P_n = (X_n, Y_n, Z_n),$$

$$P_{n+1} = (X_{n+1}, Y_{n+1}, Z_{n+1}),$$

$$\ldots$$

$$\ldots$$

$$P_E = (X_E, Y_E, Z_E).$$

Adjusted insertion trajectory:

$$P'_s = P_s + (\Delta X_s, \Delta Y_s, \Delta Z_s), \quad (1)$$
$$P'_n = P_n + (\Delta X_n, \Delta Y_n, \Delta Z_n),$$
$$P'_{n+1} = P_{n+1} + (\Delta X_{n+1}, \Delta Y_{n+1}, \Delta Z_{n+1}),$$
$$\ldots$$
$$\ldots$$
$$P'_E = P_E + (\Delta X_E, \Delta Y_E, \Delta Z_E).$$

Attitude of robot hand at any point on regular insertion trajectory:

$$\theta_s = (\theta_{As}, \theta_{Bs}, \theta_{Cs}),$$
$$\theta_n = (\theta_{An}, \theta_{Bn}, \theta_{Cn}),$$
$$\theta_{n+1} = (\theta_{A(n+1)}, \theta_{B(n+1)}, \theta_{C(n+1)}),$$
$$\ldots$$
$$\ldots$$
$$\theta_E = (\theta_{AE}, \theta_{BE}, \theta_{CE}).$$

Attitude of robot hand at any point on adjusted insertion trajectory:

$$\theta'_s = (\theta_{As}, \theta_{Bs}, \theta_{Cs}) + (\Delta\theta_{As}, +\Delta\theta_{Bs}, \Delta\theta_{Cs}), \quad (2)$$
$$\theta'_n = (\theta_{An}, \theta_{Bn}, \theta_{Cn}) + (\Delta\theta_{An}, +\Delta\theta_{Bn}, \Delta\theta_{Cn}),$$
$$\theta'_{n+1} = (\theta_{A(n+1)}, \theta_{B(n+1)}, \theta_{C(n+1)}) + (\Delta\theta_{A(n+1)}, +\Delta\theta_{B(n+1)}, \Delta\theta_{C(n+1)}),$$
$$\ldots$$
$$\ldots$$
$$\theta'_E = (\theta_{AE}, \theta_{BE}, \theta_{CE}) + (\Delta\theta_{AE}, +\Delta\theta_{BE}, \Delta\theta_{CE}).$$

Further, the adjustment program for performing insertion operation of an alternative component that is substituted for the component 5 gripped by the robot hand 1a is a program for a connection operation (insertion) such that the robot hand is moved from the reference position $P_s$, re-grips the gripped component 5, and returns to the reference position $P_s$.

The program for the robot motion adjustment mode processing shown in the flowchart of FIG. 2 and the various adjustment programs are set in advance in the robot controller 2, whereupon the robot controller 2 executes a regular automated assembly operation program and causes the robot 1 to start the automated assembly operation. On receiving the abnormal signal from the distortion determining unit 3 during the execution of the automated assembly operation program, the robot controller 2 temporarily stops the connection operation program (insertion program) in the running automated assembly program, returns the robot hand to a set reference position (an operation start position for an operation (insertion) being performed at that time) and stop the robot hand there, and starts the robot motion adjustment mode processing shown in the flowchart of FIG. 2.

First, an initially set adjustment program is executed (Step S1). If a reprocessing adjustment program is configured to perform insertion from an adjustment position $P_1$ in FIG. 3, for example, the robot is moved from the reference position $P_s$, a stop position, to the adjustment position $P_1$ to perform insertion of the component 5 into the connector 8. Then, the robot controller 2 determines whether or not an abnormal signal is delivered from the distortion determining unit 3 (Step S2). If the insertion is finished without the reception of any abnormal signal from the distortion determining unit 3 (or if the determination result in Step S2 is YES), the processing returns to the automated assembly operation program in a regular mode.

If the robot controller 2 receives an abnormal signal again from the distortion determining unit 3 during the insertion of the component 5 into the connector 8 (or if the determination result in Step S2 is NO), it restores the reference position $P_s$ and then determines whether or not there is any unexecuted adjustment program (Step S3). If there is an unexecuted adjustment (or if the last one of the preset adjustment programs is not executed, that is, if the determination result in Step S3 is YES), the processing returns to Step S1, whereupon the next adjustment program is executed. Thereafter, Steps S1 to S3 are repeatedly executed (insertion from an adjustment position $P_2$, insertion from an adjustment position $P_3$, insertion from an adjustment position $P_2$, . . . are executed in the example shown in FIG. 3) until the insertion is completed without generation of an abnormal signal from the distortion determining unit 3. If the insertion is finished without generation of an abnormal signal in the middle, the processing returns to the regular automated assembly operation program, whereupon the regular assembly operation is continued.

If no insertion is finished without generation of an abnormal signal despite the execution of all the adjustment programs, moreover, the robot motion is stopped, and the abnormal signal is delivered to notify an operator of an alarm.

Thus, distortion is caused in the printed circuit board 4 as the component 5 is inserted into the connector 8 during the automated robotic assembly operation, and the caused distortion is detected by the distortion detection unit (comprising the strain gages 6 and the measuring pads 7). On receiving the detected distortion signals through the measuring probes 9, the distortion determining unit 3 determines whether or not the detected distortion signals are larger than the threshold. If the detected distortion signals are larger than the threshold, the distortion determining unit 3 delivers the interrupt signal as the abnormal signal to the robot controller 2.

On receiving the abnormal signal, the robot controller 2 stops the robot motion (insertion) and performs each of adjustment programs for insertion with the component to be held by the robot hand, as well as the insertion position and angle, varied. If the insertion of the component 5 is consequently completed without generating an abnormal signal (or without generating a distortion signal higher than the threshold), the processing returns to the regular automated assembly operation program, whereupon the regular assembly operation is continued. If no insertion is completed without generation of an abnormal signal despite the execution of all the set adjustment programs, moreover, an alarm is generated to stop the robot motion.

Any number of positions for the arrangement of the strain gages 6 that constitute the distortion detection unit are provided in the vicinity of places liable to distortion or those components which should not be stressed. Further, the strain gages 6 may be either embedded in the circuit board 4 itself, such as a printed circuit board, or mounted as a component on the printed circuit board. Further, the strain gages 6 and the measuring pads 7 on the edge side of the printed circuit board are connected by pattern wiring of the printed circuit board.

An example of positions where the strain gages 6 and the measuring pads 7 of the distortion detection unit are arranged in the electronic device will now be described with reference to FIG. 5.

This electronic device comprises a master board 10 with a relatively large printed circuit board size and slave boards 11, 12 and 13 with a relatively small printed circuit board size. The slave boards 11, 12 and 13 are connected to the master board 10 by connectors 8a, 8b and 8c thereon, respectively, thus forming a single unit.

The robot installed on an assembly line assembles the electronic device by inserting the three slave boards 11 to 13 into the connectors 8a to 8c on the master board 10, respectively, for connecting these slave boards 11 to 13 to the connectors 8a to 8c. As the slave boards 11 to 13 are inserted into the connectors 8a to 8c on the master board 10, the master board 10 is easily distorted by misalignment between the insertion positions of the slave boards 11 to 13, interference with foreign matter, or the like. If the detected amount of distortion caused in the master board 10 by the insertion of the slave boards 11 to 13 exceeds a set threshold, the printed circuit board of the master board 10 is distorted, so that the components (slave boards 11 to 13) mounted on distorted portions are also distorted and hence stressed. Possibly, therefore, the components may be damaged and broken. Thus, as shown in FIG. 5, the distortion detection unit is configured so that strain gages 6a, 6b and 6c are arranged near the connectors 8a, 8b and 8c, respectively, measuring pads 7a, 7b and 7c are arranged on an edge side of the master board 10 in the vicinity thereof, and the strain gages 6a to 6c and the measuring pads 7a to 7c are electrically connected to one another.

Figure 5:
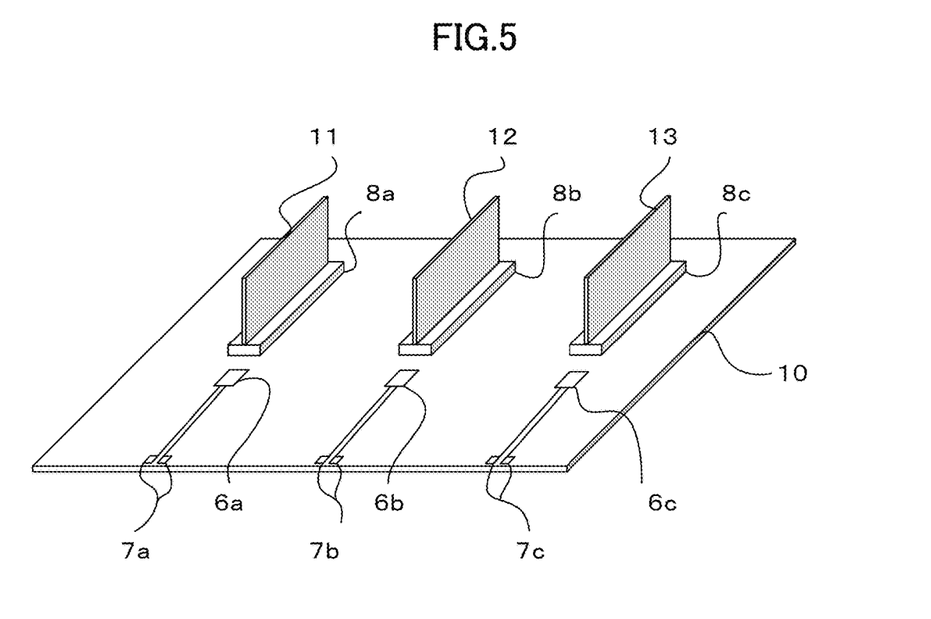
FIG. 5 is a view illustrating an example of positions where strain gages and measuring pads of a distortion detection unit are arranged in the electronic device.

In the case of the automated assembly of the electronic device shown in FIG. 5, the measuring probes that are configured to contact the measuring pads 7a to 7c of a plurality of distortion detection units and take out distortion signals are provided in association with the measuring pads 7a to 7c, respectively. The distortion determining unit compares the distortion signals output from the distortion detection units with the threshold. If any of the distortion signals exceed the threshold, the distortion determining unit outputs an abnormal signal to the robot controller, thereby temporarily stopping the execution of the automated assembly operation program by the robot controller.

While the example shown in FIG. 5 is an example in which a printed circuit board is fastened to another printed circuit board, it is also applicable to a case in which a general component is fastened to a printed circuit board.

The following is a description of an automated robotic assembly system according to a second embodiment of the present invention.

The present invention is also applicable to automated assembly other than the automated assembly of an electronic device comprising a printed circuit board. Also in a case in which a device is automatically assembled by assembling together a component made of a material liable to deformation and distortion by external force and another component by a robot, the component made of the material liable to deformation and distortion may sometimes be deformed and distorted by the assembly operation. In some cases, failures, such as distortion and deformation, of the device assembled with the component deformed and distorted cannot be detected at the time of the assembly. However, the failures may be actualized during prolonged use of the assembled device, and in such a case, the device cannot be regarded as conforming.

An example in which the present invention is applied to an automated assembly system for automatically assembling a display unit used in a machine or device, such as a numerical controller, will be described below as the second embodiment.

In this embodiment, the front surface of the display unit is fitted with a front cover that covers a liquid-crystal panel from the outside. The front cover comprises a transparent resin plate that covers a display screen of the liquid-crystal panel and a resin frame (hereinafter referred to as "escutcheon") that covers the other contour portion. These two components are bonded together with an adhesive or a double-sided tape. The front cover is fastened to the liquid-crystal panel by screws.

In automatically assembling this display unit by means of the robot, the robot uses a dedicated fixture to hold the liquid-crystal panel and position and fasten it to the front cover. Another robot serves to tighten the screws to automatically attach and secure the front cover to the liquid-crystal panel, thereby achieving the assembly. If the front cover and the liquid-crystal panel are misaligned for any reason or if any foreign matter is trapped during this work, the front cover may sometimes be deformed by the screw-tightening work in the connection work.

Due to this deformation, a part of the junction between the transparent resin and the escutcheon which are joined via an adhesive or the like may possibly be peeled off, thereby causing failures, such as minute gaps and cracks, which may result in loss of sealing performance for waterproof performance of the display unit.

Thus, in this embodiment, as in the first embodiment described above, a distortion detection unit is disposed in such a manner that electrically connected strain gages and measuring pads are affixed to those portions of the escutcheon which are liable to distortion, and measuring probes are provided so as to be connected to the measuring pads that constitute the detection unit. A distortion determining unit is provided for determining the size of the distortion by distortion signals detected through the measuring probes, whereby the distortion of the front cover is monitored as automated assembly work is performed. If an abnormal signal is generated from the distortion determining unit such that the sizes of the distortion signals detected by the distortion detection unit exceed the threshold, a robot controller generates an alarm and stops the assembly operation by the robot. The front cover that covers the liquid-crystal panel from the outside is distorted during the connection work in which the front cover is connected to the liquid-crystal panel by tightening the screws, so that the robot motion to tighten the screws is stopped.

If an alarm is generated and the assembly operation of the robot is suspended, the cause of the suspension of the robotic assembly operation is investigated and removed, and the assembly operation is resumed. In this way, devices with components deformed and distorted can be prevented from being automatically assembled.

Also in this embodiment, as in the first embodiment, moreover, an adjusting unit may be provided for adjusting the robot motion for automated assembly in the same manner as in the aforementioned automated assembly system for the electronic device comprising the printed circuit board. By this adjusting unit, the robot motion can be adjusted so as to prevent the production of distortion or deformation and to automatically assemble the device, such as the display unit, without deformation or distortion.

In the case of this automated assembly of the display unit, due to misalignment of the liquid-crystal panel with respect to a front cover, the front cover is deformed and distorted when the liquid-crystal panel is attached to the front cover by tightening the screws. Thereupon, the distortion detection unit detects the deformation and distortion while the screws are being tightened by the screw-tightening robot. If an abnormal signal is generated from the distortion determining unit based on the detected distortion, a robot controller for the screw-tightening robot removes the attached screws, thereby releasing the screw fastening, and then stops the screw removal work. Thereafter, a robot controller for the robot for liquid-crystal panel transport adjusts the position/ attitude of the liquid-crystal panel relative to the front cover.

This position adjustment of the liquid-crystal panel relative to the front cover includes adjustment of movement of the liquid-crystal panel parallel to its plane, rotation about an axis perpendicular to the panel plane, and the like. As in the first embodiment, a plurality of adjustment programs are set in advance based on a predetermined moving direction, movement amount, direction of rotation, and rotation amount, and adjustment mode processing similar to the processing shown in FIG. 2 is performed.

One adjustment program is executed so that the screw-tightening robot is made to perform the screw-tightening work after the liquid-crystal panel is moved or rotated by a predetermined amount. If an abnormal signal is generated again from the distortion determining unit during the execution of the screw-tightening work, the attached screws are removed by the screw-tightening robot so that the screw fastening is released, and the screw removal work is then stopped. Subsequently, the next adjustment program is executed. Thereafter, the processing returns to the regular automated assembly program when the screw-tightening work is completed without causing any deformation or distortion in the front cover and without generating any abnormal signal as the set adjustment programs are sequentially executed. If an abnormal signal is generated despite the execution of all the adjustment programs, in contrast, the robot motion is stopped and an alarm is generated for operator information.

In the embodiments described above, the printed circuit board or the front cover of the display unit is given as an example of a component made of a material liable to deformation by external force. Materials liable to deformation by external force include a member that is deformable by excessive force during a component-connection operation in which a device is automatically assembled.

The invention claimed is:

1. An automated robotic assembly system configured to assemble a device by fitting a component made of a material liable to deformation by external force with another component by means of a robot, the automated robotic assembly system comprising:
   a robot controller configured to control the robot;
   a distortion detection unit provided on the component made of the material liable to deformation and configured to detect distortion thereof; and
   a distortion determining unit configured to receive a distortion signal detected by the distortion detection unit and output an abnormal signal when a size of the distortion signal exceeds a predetermined threshold,
   wherein the robot controller is configured to stop an automated assembly operation by the robot when the abnormal signal is output by the distortion determining unit.

2. The automated robotic assembly system according to claim 1, wherein the distortion detection unit is disposed in each of a plurality of positions on the component made of the material liable to deformation.

3. The automated robotic assembly system according to claim 1, wherein
   the robot controller comprises an adjusting unit configured to adjust a robot motion for connecting components with each other in the automated assembly operation,
   after the abnormal signal is output by the distortion determining unit and the automated assembly operation is stopped, the robot controller is configured to adjust the robot motion by the adjusting unit and carry out the automated assembly operation, and
   when the robot motion for connecting components is completed without the abnormal signal output from the distortion determining unit, the robot controller is configured to continue control of a subsequent automated assembly operation.

4. The automated robotic assembly system according to claim 3, wherein
   the adjusting unit of the robot controller is configured to previously store adjustment programs for the robot motion for connecting components, wherein a position or an attitude of a robot hand of the robot is varied among the stored adjustment programs, and
   the robot controller is configured to sequentially execute the stored adjustment programs when the abnormal signal is output by the distortion determining unit.

5. The automated robotic assembly system according to claim 4, wherein the adjustment programs also include a robot motion program for connecting components with each other by replacing a component to be attached to the component made of the material liable to deformation with another component.

6. The automated robotic assembly system according to claim 1, wherein the component made of the material liable to deformation is a printed circuit board.

7. The automated robotic assembly system according to claim 6, wherein a robot motion for connecting components with each other in the automated assembly operation is a motion to insert another component into a connector provided on the printed circuit board.

* * * * *